United States Patent
Dai et al.

(10) Patent No.: US 9,646,362 B2
(45) Date of Patent: May 9, 2017

(54) ALGORITHM FOR IMPROVED ZOOMING IN DATA VISUALIZATION COMPONENTS

(71) Applicant: Oracle International Corporation, Redwood Shores, CA (US)

(72) Inventors: Yi Dai, Winchester, MA (US); Hugh Zhang, Winchester, MA (US); Jairam Ramanathan, Waltham, MA (US); Prashant Singh, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 182 days.

(21) Appl. No.: 14/031,030

(22) Filed: Sep. 18, 2013

(65) Prior Publication Data
US 2015/0077433 A1 Mar. 19, 2015

(51) Int. Cl.
*G09G 5/377* (2006.01)
*G06T 3/40* (2006.01)

(52) U.S. Cl.
CPC .................................. *G06T 3/40* (2013.01)

(58) Field of Classification Search
CPC ......... G06T 19/00; G06T 17/20; G06T 17/00; G06T 3/40; G09G 5/377
USPC .................................................. 345/419, 629
See application file for complete search history.

(56) References Cited

U.S. PATENT DOCUMENTS

| | | | | |
|---|---|---|---|---|
| 6,377,285 | B1* | 4/2002 | Doan | G06F 3/0481 345/619 |
| 7,483,025 | B2* | 1/2009 | Roy | G06F 17/30241 345/440 |
| 2004/0207654 | A1* | 10/2004 | Hasuike | G06F 17/30905 345/698 |
| 2008/0231643 | A1* | 9/2008 | Fletcher | G06T 17/05 345/661 |
| 2008/0309676 | A1* | 12/2008 | Nehab | G06T 9/00 345/582 |
| 2012/0194708 | A1* | 8/2012 | Nikkanen et al. | 348/240.2 |
| 2013/0169644 | A1* | 7/2013 | Bolton | H04Q 9/00 345/440 |

OTHER PUBLICATIONS

Dailey, David, "An SVG Primer for Today's Browsers", W3C Wordking Draft, Slippery Rock University, Sep. 2010, pp. 1-200, [Retrieved on Mar. 31, 2015]. Retrieved from the Internet<URL: http://www.w3.org/Graphics/SVG/IG/resources/svgprimer.html>.*
Dailey, David; "An SVG Primer for Today's Browers"; W3C Working Draft, Slippery Rock University; Sep. 2010 147 pages.

* cited by examiner

*Primary Examiner* — Barry Drennan
*Assistant Examiner* — Terrell Robinson
(74) *Attorney, Agent, or Firm* — Trellis IP Law Group, PC (57) ABSTRACT

Example embodiments reduce the processing required to zoom on graphical data visualizations by transforming only graphic elements visible in the zooming viewport. In one example embodiment, a grid overlays the component image. Prior to zooming, grid elements covered by the zooming viewport are determined and only graphic objects bounded by those grid elements are transformed during zooming.

14 Claims, 9 Drawing Sheets

ALGORITHM FOR IMPROVED ZOOMING IN DATA VISUALIZATION COMPONENTS

BACKGROUND

The present application relates to vector based software rendering applications and more specifically vector based zooming transformations.

Many data visualization applications, for example map applications, provide a zoom feature which allows a user to increase or decrease the size of objects in the viewing field.

Zooming is a type of animation. In vector based imaging programs, such as the Scalar Vector Graphics (SVG) standard promulgated by the World Wide Web Consortium, simple graphic elements are defined by tags in an Extensible Markup Language (XML) document. Complex graphic images can be composed using the basic graphic elements. The appearance and location of a particular graphic element are controlled by assigning values to the attributes of the graphic element.

Animation of a vector based image is achieved by changing values of selected attributes of selected graphic elements over time. Zooming generally requires a change of scale of selected graphic elements to change their size over time. Zooming in requires that the scale be increased over time and zooming out requires that the scale be decreased over time. In some types of images, such as, for example, maps, a zooming transformation is applied only to an underlying map image while markers, such as place names or other indicia, are to remain the same size. Further, in many cases the markers are to remain in the same position, e.g., have the same latitude and longitude coordinates, relative to the zoomed map image. Accordingly, the markers must be translated during the zooming process to preserve the relationships between different graphic elements in the map image and the markers during the zooming process.

SUMMARY

Various embodiments are described which reduce the amount of processing required to zoom in or out on a selected portion of a vector based image. In one embodiment, only those graphic objects visible in the zooming viewport are transformed, significantly reducing the processing time.

In one example, pluralities of grid elements of a grid are referenced to the coordinate system of the data visualization component. The grid element coordinates are compared to graphic object coordinates to determine which graphic objects are bounded by each grid element.

In this example embodiment, before a zooming transformation is begun a set of covered grid elements covered by the zooming viewport is determined and a list of graphic objects bounded by the set of covered grid elements is created. The zooming transformation is then applied only to graphic objects included in the list.

A further understanding of the nature and the advantages of particular embodiments disclosed herein may be realized by reference to the remaining portions of the specification and the attached drawings.

DETAILED DESCRIPTION OF EMBODIMENTS

In the following embodiments will be described, by way of example not limitation, using the terminology of the SVG standard. The implementation of the embodiments described below is not limited to a particular graphic editor or graphic language.

An ubiquitous application of zooming is in map programs because a user typically wants to have high level views of an area and then wishes to view parts of the area in various degrees of detail.

Figure 1:
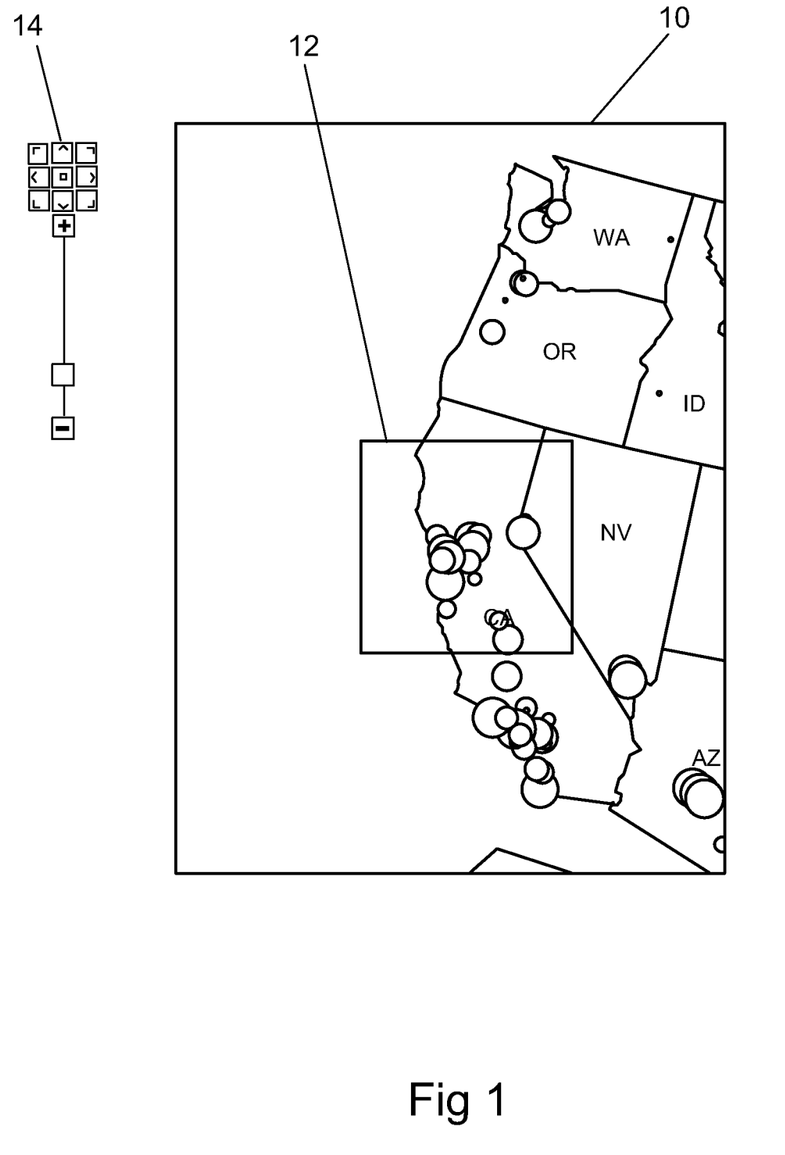
FIG. 1 depicts an example component image.

FIG. 1 depicts a Thematic Map component developed by the assignee of the present application. In FIG. 1 a vector based image of a map of parts of California and Nevada is displayed in a first viewport 10. Circles of various sizes and text elements are displayed as markers overlaying the map. A configurable zooming window 12 allows a user to select a portion of the map to zoom into using a zoom control 14.

FIG. 1 depicts the entire image which is defined by the graphic elements in a SVG XML source document of a component. However, in many cases the entire image would not be displayed on the display screen of an actual device. In many cases, especially for small display screens on mobile devices, only a portion of the entire SVG content is rendered on the screen. An SVG viewport within the SVG canvas defines the rectangular region into which SVG content of the component is rendered. A viewport may be defined which displays a selected portion of the map image 10.

Figure 2:
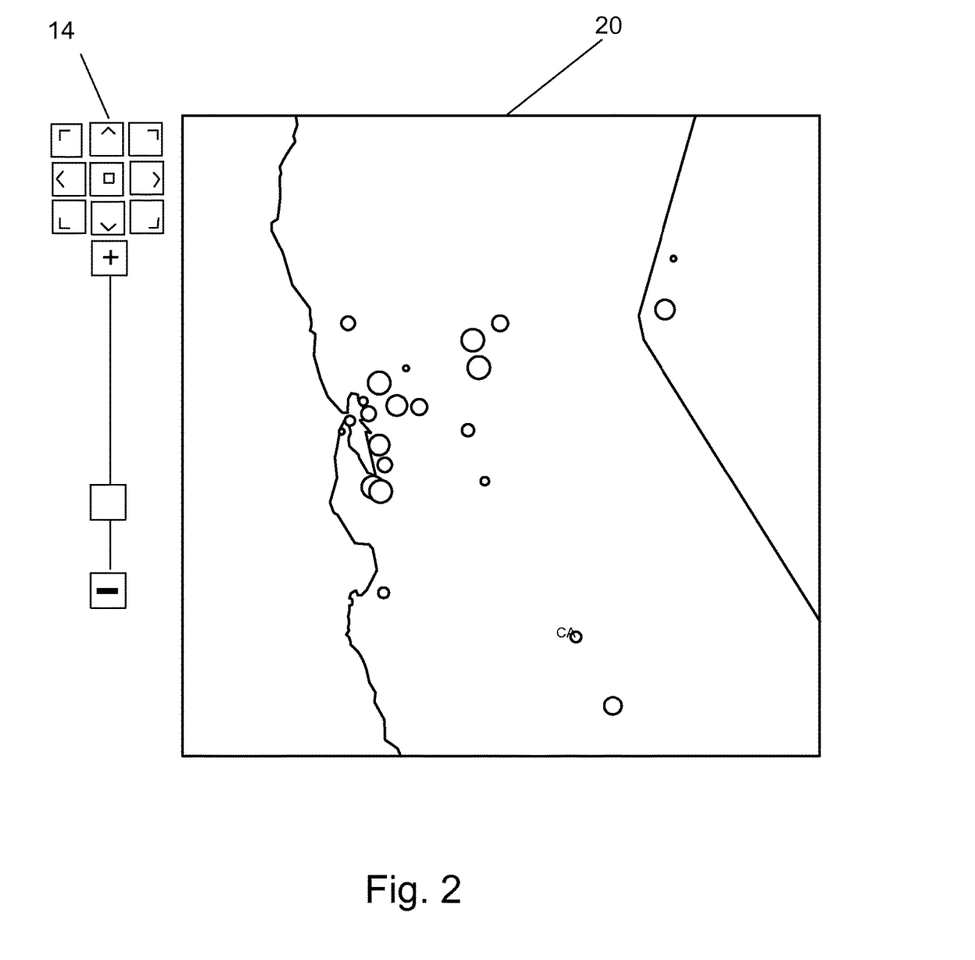
FIG. 2 depicts the display of a selected portion of the example component image.

FIG. 2 depicts an example of zooming in where the selected portion of the map enclosed by the zooming window 12 is displayed in a second viewport 20, which is in this example is the same size as the first viewport 10.

In this example the scale of the selected portion of the map image is increased to cause the selected portion of the map to fill the second viewport 20. This increase in scale is performed by applying the same scale transformation to all the vector elements of the map.

However, the scale transformation is not applied to the markers because the markers remain the same size as in FIG. 1. Further, translation transformations are applied to the vector elements forming the markers so that the markers remain in the same relative position, i.e., the same latitude and longitude, in the zoomed image that the markers had in the original image.

In a zooming out operation a the scale of the image would be decreased so that a larger portion of the image is displayed in the second viewport 20.

With today's browsers and hardware, zoom transformations that correctly place text and markers require separate transformation for each marker and text element and often result in choppy and nearly unusable zoom interactions when zooming needs to be performed for large data sets. These effects are especially prevalent in mobile devices, such as, for example, the IPAD tablet, IPHONE and ANDROID smart phones and other tablets, which tend to have much less processing power than desktop computers.

Current zooming techniques for mobile devices either transform every object or remove objects while zooming. The first zooming technique is slow because objects such as markers and labels must be individually transformed in order to maintain position and size. The second zooming technique loses context while zooming.

A first example embodiment will now be described that utilizes an algorithmic approach to reduce the number of transformations performed during a zooming transformation by limiting transformations to the objects in the current viewable area. Transformations can be done for all objects in the viewable area in real time to retain context and allow for a smoother zooming experience.

In this embodiment, objects are assigned to different grid elements within the component image. These assignments are used for faster analysis in determining which objects are in the viewable zooming area. Non-viewable objects are hidden and are not processed by current zooming transformations until the objects reenter the viewable area.

Figure 3:
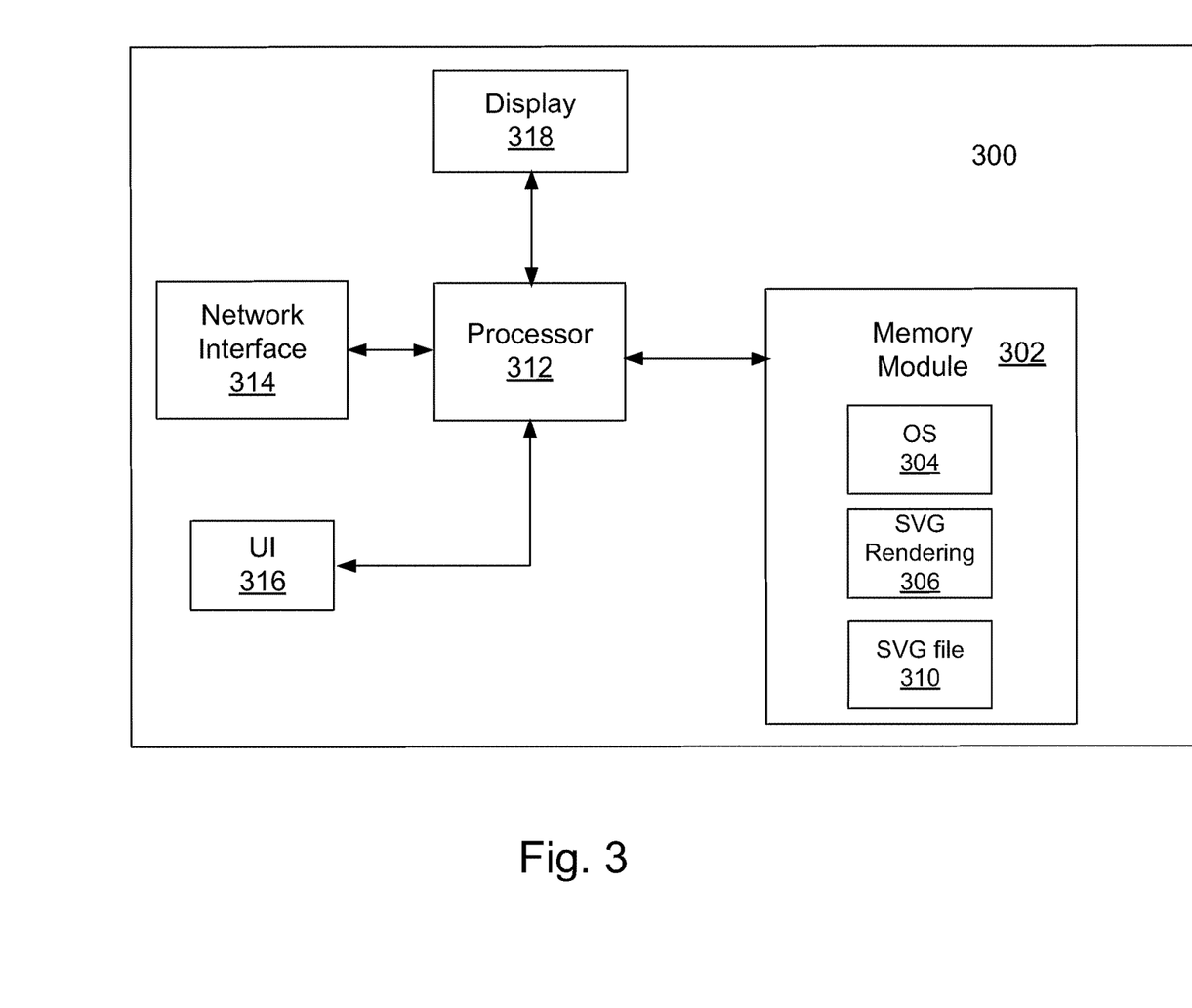
FIG. 3 is a block diagram illustrating an example mobile device system for implementing example embodiments.

FIG. 3 is a block diagram of a mobile device system 300 for implementing example embodiments. The mobile device system 300 includes a memory module 302 storing data and program code. In this example, the memory module 302 stores the device operating system 304, for example IOS operating system or the ANDROID operating system, an SVG rendering client-side application 306, and data 310 such as an SVG file to be rendered.

A processor 312 is coupled to the memory module 302, a network interface 314, a user interface (UI) 316 and a display 318. The processor 312 may comprise multiple processing units including a graphics processor.

In an example embodiment, the SVG rendering client-side application 306 may be created using the Oracle Application Development Framework Mobile (ADF Mobile) developed by the assignee of the present application, which enables developers to build and extend enterprise applications for iOS and Android from a single code base. Mobile ADF supports access to native device services and enables offline applications.

In an example embodiment, the mobile device system 300 is part of a computer system. In the following a computer system may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Figure 4:
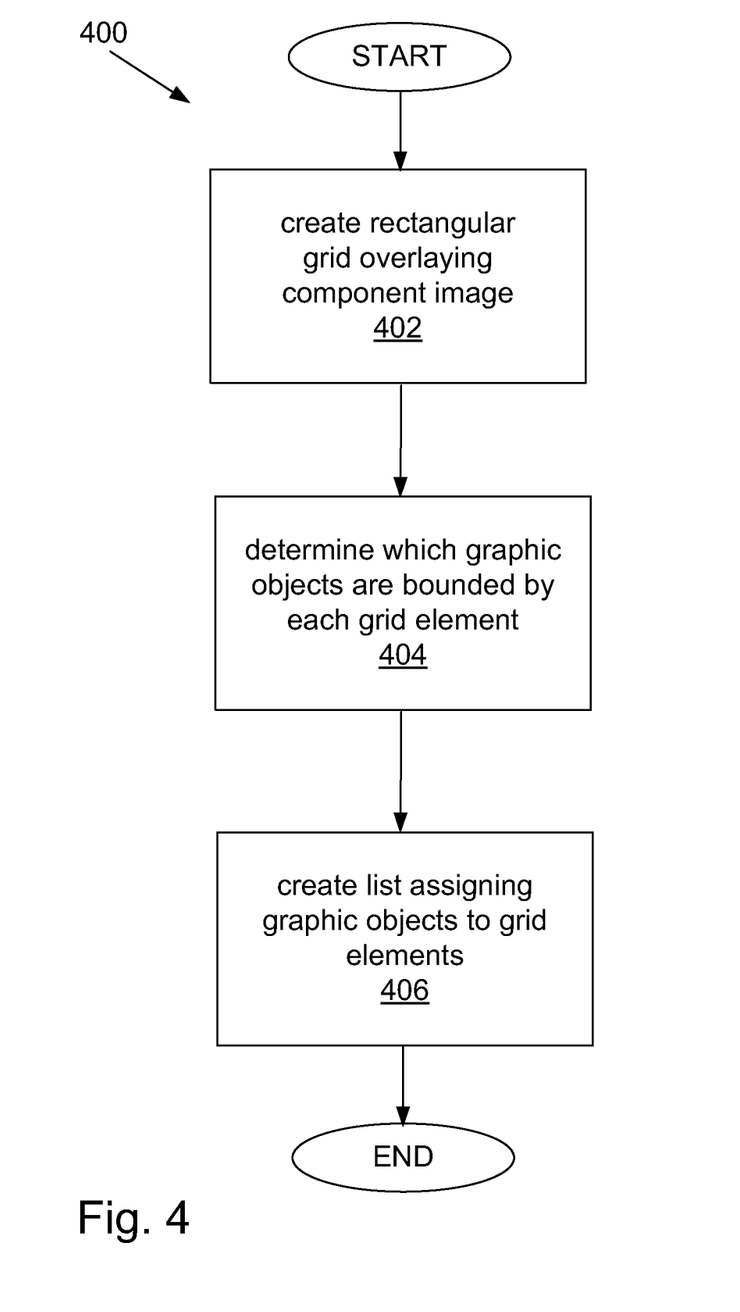
FIGS. 4 and 5 are flow charts illustrating the operation of example embodiments.

FIG. 4 is a flow chart 400 illustrating an example process of assigning graphic objects to grid elements. In this example, locations in the image component space are referenced to a coordinate system.

In process step 402 a rectangular grid is defined to split up the image component space into a number of rectangular grid elements. In this process step the coordinates of each grid element are specified.

In process step 404 the coordinates of each graphic object are compared to the grid element coordinates to determine whether the graphic object is bounded by one of the grid elements.

In process step 406 a list assigning each graphic object to one or more grid elements is created.

Figure 5:
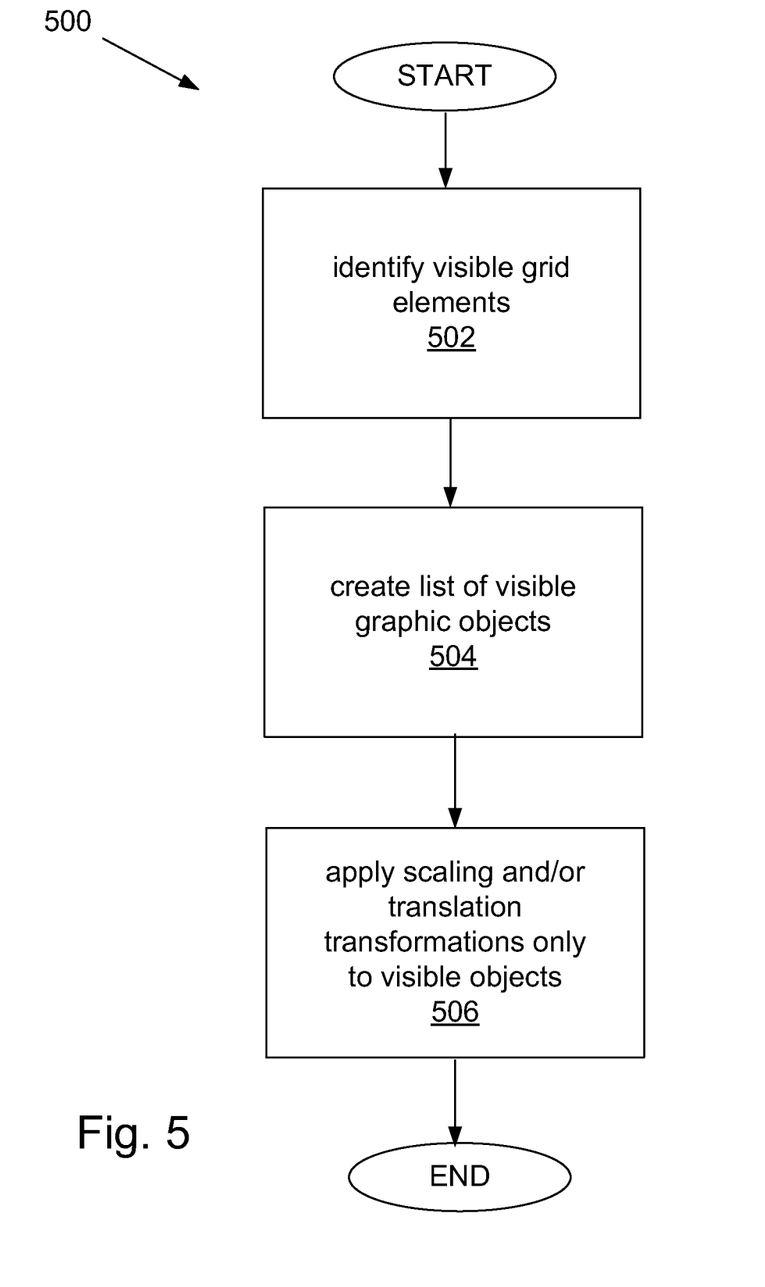

FIG. 5 is a flow chart 500 illustrating an example of a zooming operation that transforms only object elements located in a viewing area. In an example operative scenario, a user employs the user interface hardware 316 to select a zooming operation.

In process step 502 the identities of visible grid elements which are visible in the zoomed-in viewing area are determined.

In process step 504 a list of all visible graphic objects bounded by the visible grid elements is created.

In process step 506, during the zooming-in operation the zoom transformations are applied only to visible graphic objects.

The following is pseudo-code listing the process steps of FIGS. 4 and 5 in greater detail.

```
// The goal of this algorithm is to simplify the component space so that data
objects are identified that must be modified on a pan or zoom operation.
// To do this, the grid elements to which each data object belong are calculated.
// On zoom or pan, the grid information is used to construct a list of data objects that are
visible.
// The necessary transformations are then performed on these visible objects.
// On initial render, split up the component space into a grid where width and height
define the component size.
// 3x3 is used here, but any number of grid elements would work.
int numRows = 3, numCols = 3;
int gridWidth = width/3, gridHeight = height/3;
List[ ][ ] grid = new List[numRows][numCols];
Rectangle[ ][ ] gridBounds = new Rectangle[numRows][numCols]; // This is populated
with the bounds of each grid element.
// Loop through the data objects and identify the grid elements that they belong to. Add
them to the list for those grid elements.
for(Object dataObj : dataObjs) {
  // Loop through the grid elements and check if they contain the dataObj bounding
  for(int row=0; row<numRows; row++) {
    for(int col=0; col<numCols; col++) {
      if(gridBounds[row][col].intersects(dataObj.getBounds))
        grid[row][col].add(dataObj);
    }
  }
}
// On zoom, determine the grid elements that are visible. Assume viewportBounds is the
zoomed viewport bounds and concatenate the list of objects within each visible cell.
boolean[ ][ ] visible = new boolean[numRows][numCols];
```

```
List visibleObjects = new ArrayList( );
for(int row=0; row<numRows; row++) {
  for(int col=0; col<numCols; col++) {
    if (gridBounds[row][col].intersects(viewportBounds))
      visibleObjects.addAll(grid[row][col]);
  }
}
// A list of the visible objects now exists that simplifies calculating and zoom and pan
transformations are applied only to those and hide all non-visible objects.
```

Figure 6A:
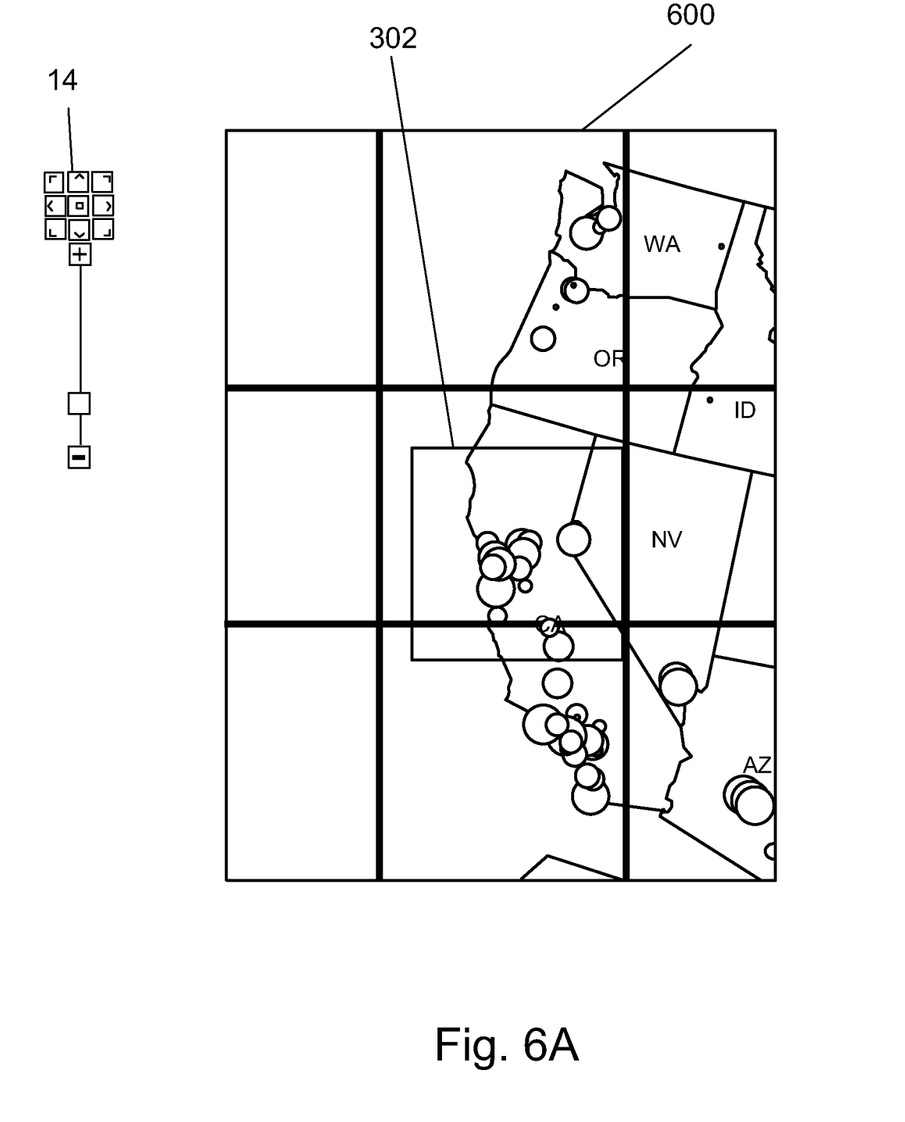
FIGS. 6A and B illustrate an example component image overlaid by a grid.

A visualization of the operations defined in FIGS. 4 and 5 and the pseudo-code is depicted in FIGS. 6A and B.

FIG. 6A depicts the component image of FIG. 2 overlaid with a grid having three rows and three columns. Each grid element is labeled by its row number and column number. Also depicted in FIG. 6A is a zoom window 602. In this example a user wants to zoom in the on the coastline of California and a part of Nevada.

Figure 6B:
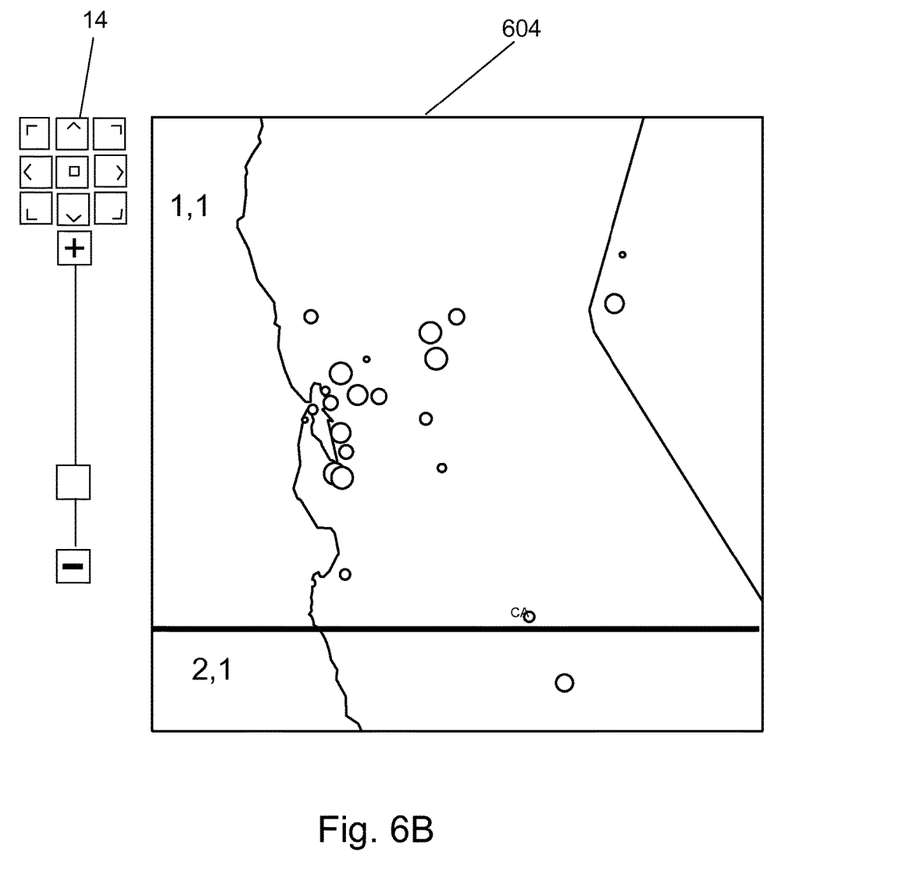

FIG. 6B depicts a zoomed viewport 604 showing the zoomed-in image. Note that only data objects in grid elements (1,1) and (2,1) are depicted in the zoomed viewport 604. Accordingly, the zooming algorithm of this embodiment transforms only the graphic objects bounded by grid elements (1,1) and (2,1) to substantially reduce the amount of processing required compared to existing techniques while still maintaining context throughout the zooming process.

Figure 7:
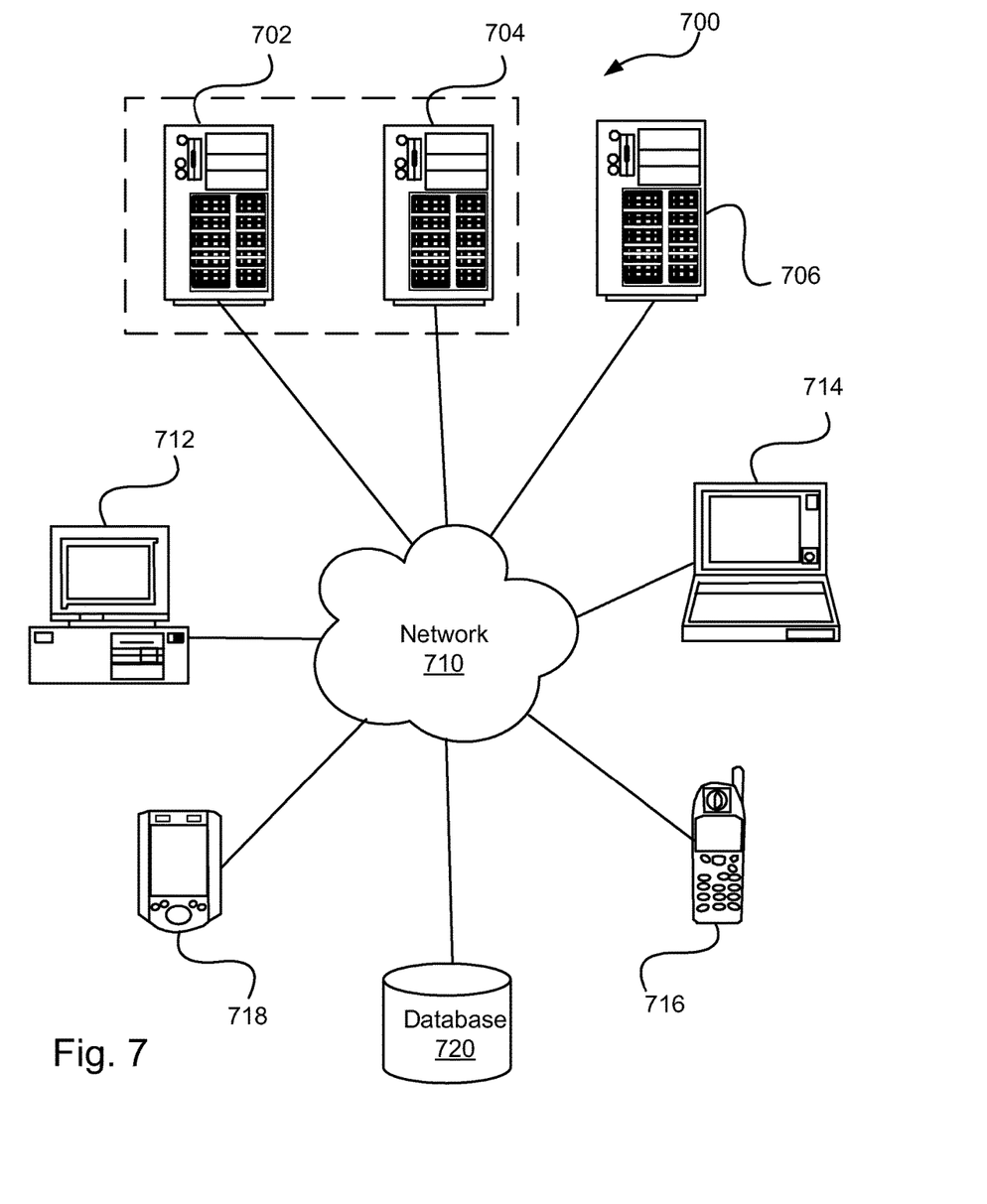
FIG. 7 is a block diagram illustrating components of an example operating environment in which various embodiments of the present invention may be implemented.

FIG. 7 is a block diagram illustrating components of an example operating environment in which various embodiments of the present invention may be implemented. The system 700 can include one or more user computers, computing devices, or processing devices 712, 714, 716, 718, which can be used to operate a client, such as a dedicated application, web browser, etc. The user computers 712, 714, 716, 718 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 712, 714, 716, 718 may also have any of a variety of applications, including one or more development systems, database client and/or server applications, and Web browser applications. Alternatively, the user computers 712, 714, 716, 718 may be any other electronic device, such as a thin-client computer, Internet-enabled gaming system, and/or personal messaging device, capable of communicating via a network (e.g., the network 710 described below) and/or displaying and navigating Web pages or other types of electronic documents. Although the example system 700 is shown with four user computers, any number of user computers may be supported.

In most embodiments, the system 700 includes some type of network 710. The network may be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 702, 704, 706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 706) may be dedicated to running applications, such as a business application, a Web server, application server, etc. Such servers may be used to process requests from user computers 712, 714, 716, 718. The applications can also include any number of applications for controlling access to resources of the servers 702, 704, 706.

The Web server can be running an operating system including any of those discussed above, as well as any commercially-available server operating systems. The Web server can also run any of a variety of server applications and/or mid-tier applications, including HTTP servers, FTP servers, CGI servers, database servers, JAVA programming language servers, business applications, and the like. The server(s) also may be one or more computers which can be capable of executing programs or scripts in response to the user computers 712, 714, 716, 718. As one example, a server may execute one or more Web applications. The Web application may be implemented as one or more scripts or programs written in any programming language, such as Java, C, C# or C++, and/or any scripting language, such as PERL, PYTHON, or TCL scripting languages, as well as combinations of any programming/scripting languages. The server(s) may also include database servers, including without limitation those commercially available from ORACLE, MICROSOFT, SYBAS, IBM corporations and the like, which can process requests from database clients running on a user computer 712, 714, 716, 718.

The system 700 may also include one or more databases 720. The database(s) 720 may reside in a variety of locations. By way of example, a database 720 may reside on a storage medium local to (and/or resident in) one or more of the computers 702, 704, 706, 712, 714, 716, 718. Alternatively, it may be remote from any or all of the computers 702, 704, 706, 712, 714, 716, 718, and/or in communication (e.g., via the network 710) with one or more of these. In a particular set of embodiments, the database 720 may reside in a storage-area network ("SAN") familiar to those skilled in the art. Similarly, any necessary files for performing the functions attributed to the computers 702, 704, 706, 712, 714, 716, 718 may be stored locally on the respective computer and/or remotely, as appropriate. In one set of embodiments, the database 720 may be a relational database, such as Oracle 10g, that is adapted to store, update, and retrieve data in response to SQL-formatted commands.

Figure 8:
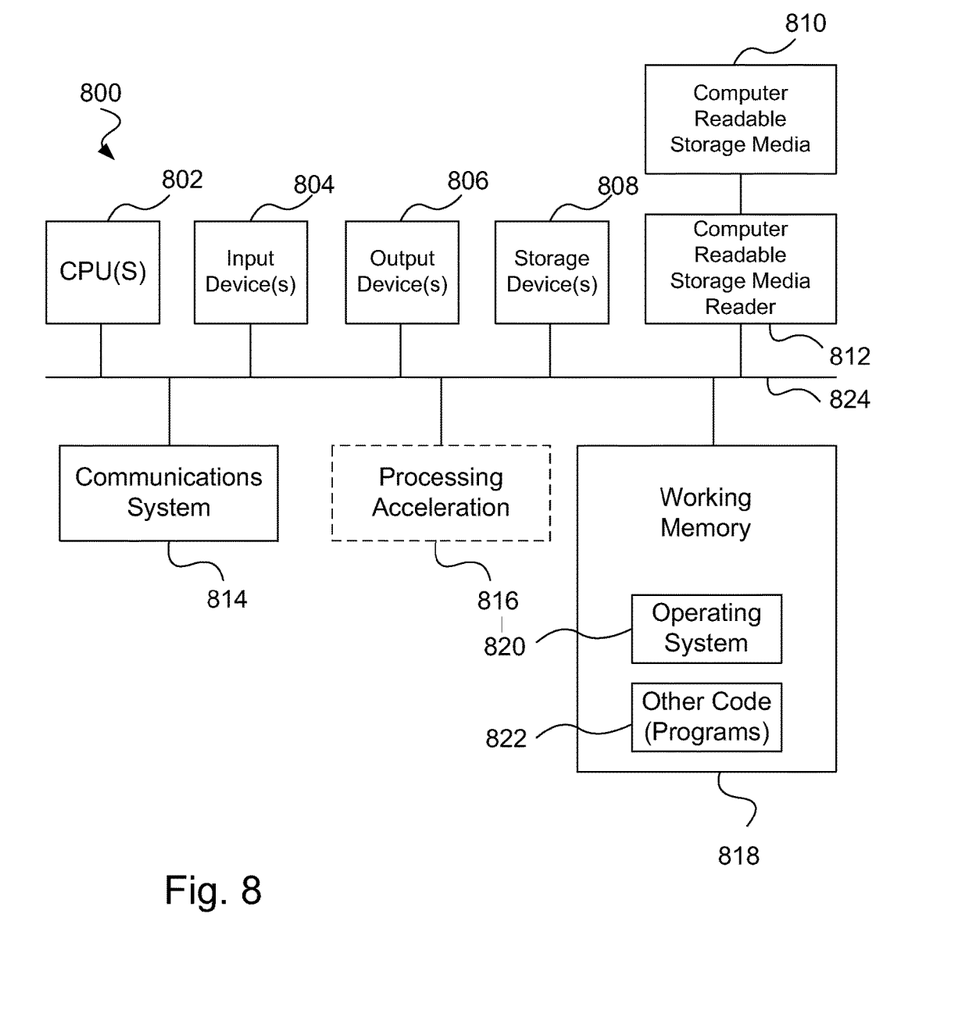
FIG. 8 illustrates an example computer system in which various embodiments of the present invention may be implemented.

FIG. 8 illustrates an example computer system 800, in which various embodiments of the present invention may be implemented. The system 800 may be used to implement any of the computer systems described above. The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 812, a communications system 814 (e.g., a modem, a network card (wireless or wired), an infra-red communication device, etc.), and working memory 818, which may include RAM and ROM devices as described above. In some embodiments, the computer system 800 may also include a processing acceleration unit 816, which can include a digital signal processor DSP, a special-purpose processor, and/or the like.

The computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing computer-readable information. The communications system 814 may permit data to be exchanged with the network and/or any other computer described above with respect to the system 800.

The computer system 800 may also comprise software elements, shown as being currently located within a working memory 818, including an operating system 820 and/or other code 822, such as an application program (which may be a client application, Web browser, mid-tier application, RDBMS, etc.). It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Although the description has been described with respect to particular embodiments thereof, these particular embodiments are merely illustrative, and not restrictive. For example, zooming operations have been described above but the principles described may be applied to other transformations when the viewport size is changed. Further, various types of controls, such a slider, buttons etc., may be used to initiate and control zooming operations.

Any suitable programming language can be used to implement the routines of particular embodiments including C, C++, JAVA programming language, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices and field programmable gate arrays. Optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine readable medium to permit a computer to perform any of the methods described above.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material within the essential scope and spirit.

We claim:

1. A method, performed by a computer system, comprising:

splitting, by the computer system, a component image into a plurality of rectangles forming grid elements of a grid overlaying the component image, with locations in the component image referenced to a coordinate system and with the component image including a plurality of vector-based graphic objects having object coordinates locating the vector-based graphic objects in the component image;

referencing, by the computer system, the grid elements to the coordinate system to assign coordinates to each grid element;

comparing, by the computer system, coordinates of grid elements to object coordinates of vector-based graphic objects in the component image to create a grid data structure that lists assigned vector-based graphic objects for each grid element with an assigned vector-based graphic objects bounded by the grid element;

determining, by the computer system and with reference to coordinates of grid elements, a set of visible grid elements visible in a zoom viewport after a zooming operation;

referencing, by the computer system, the grid data structure to create a list of visible assigned vector-based graphic elements bounded by the visible grid elements; and changing, by the computer system, attributes of only visible assigned vector-based graphic objects over time during the zooming operation to change the size of the visible assigned vector-based graphic objects without changing attributes of non-visible graphic objects during the zooming operation.

2. The method of claim 1 where creating a data structure further comprises:
comparing grid element coordinates of a selected grid element to coordinates of a selected vector-based graphic object to determine whether the selected vector-based graphic object is bounded by the selected grid element.

3. The method of claim 1 where determining a set of visible grid elements further comprises:
comparing grid element coordinates to zooming viewport coordinates.

4. The method of claim 1 where grid elements are implemented using a clipPath element.

5. The method of claim 1 with transforming further comprising:
applying Scalar Vector Graphics (SVG) transformation to vector-based graphic objects.

6. An apparatus comprising:
one or more processors;
a display coupled to the one or more processors; and
logic encoded in one or more non-transitory computer readable media for execution by the one or more processors and with the one or more processors, when executing the logic, performing the acts of:
splitting a component image into a plurality of rectangles forming grid elements of a grid overlaying the component image, with locations in the component image referenced to a coordinate system and with the component image including a plurality of vector-based graphic objects having object coordinates locating the vector-based graphic objects in the component image;
referencing the grid elements to the coordinate system to assign coordinates to each grid element;
comparing coordinates of grid elements to object coordinates of vector-based graphic objects in the component image to create a grid data structure that lists assigned vector-based graphic objects for each grid element with an assigned vector-based graphic objects bounded by the grid element;
determining, with reference to coordinates of grid elements, a set of visible grid elements visible in a zoom viewport after a zooming operation;
referencing the grid data structure to create a list of visible assigned vector-based graphic elements bounded by the visible grid elements; and
changing attributes of only visible assigned vector-based graphic objects over time during the zooming operation to change the size of the visible assigned vector-based graphic objects without changing attributes of non-visible graphic objects during the zooming operation.

7. The apparatus of claim 6 where creating a data structure further comprises:
comparing grid element coordinates of a selected grid element to coordinates of a selected vector-based graphic object to determine whether the selected vector-based graphic object is bounded by the selected grid element.

8. The apparatus of claim 6 where determining a set of visible grid elements further comprises:
comparing grid element coordinates to zooming viewport coordinates.

9. The apparatus of claim 6 where grid elements are implemented using a clipPath element.

10. The apparatus of claim 6 with transforming further comprising:
applying Scalar Vector Graphics (SVG) transformation to vector-based graphic objects.

11. A non-transitory computer readable storage medium comprising encoded program code for execution by one or more computer processors on a computer, the program code when executed is executable to perform the acts of:
splitting a component image into a plurality of rectangles forming grid elements of a grid overlaying the component image, with locations in the component image referenced to a coordinate system and with the component image including a plurality of vector-based graphic objects having object coordinates locating the vector-based graphic objects in the component image;
referencing the grid elements to the coordinate system to assign coordinates to each grid element;
comparing coordinates of grid elements to object coordinates of vector-based graphic objects in the component image to create a grid data structure that lists assigned vector-based graphic objects for each grid element with an assigned vector-based graphic objects bounded by the grid element;
determining, with reference to coordinates of grid elements, a set of visible grid elements visible in a zoom viewport after a zooming operation;
referencing the grid data structure to create a list of visible assigned vector-based graphic elements bounded by the visible grid elements; and
changing attributes of only visible assigned vector-based graphic objects over time during the zooming operation to change the size of the visible assigned vector-based graphic objects without changing attributes of non-visible graphic objects during the zooming operation.

12. The non-transitory computer-readable storage medium of claim 11 further comprising program code that when executed is executable to perform the act of:
comparing grid element coordinates of a selected grid element to coordinates of a selected vector-based graphic object to determine whether the selected vector-based graphic object is bounded by the selected grid element.

13. The non-transitory computer-readable storage medium of claim 11 further comprising program code that when executed is executable to perform the act of:
   comparing grid element coordinates to zooming viewport coordinates to determine visible grid elements.

14. The non-transitory computer-readable storage medium of claim 11 further comprising program code implements transforms using Scalar Vector Graphics (SVG) transformations and that implements grid elements using an SVG clipPath element.

\* \* \* \* \*

UNITED STATES PATENT AND TRADEMARK OFFICE
CERTIFICATE OF CORRECTION

PATENT NO.       : 9,646,362 B2
APPLICATION NO.  : 14/031030
DATED            : May 9, 2017
INVENTOR(S)      : Dai et al.

It is certified that error appears in the above-identified patent and that said Letters Patent is hereby corrected as shown below:

On the Title Page

Column 2, under Other Publications, Line 2, delete "Wordking" and insert -- Working --, therefor.

Column 2, under Other Publications, Line 5, delete "Browers"" and insert -- Browsers" --, therefor.

In the Specification

In Column 1, Line 67, delete "image:" and insert -- image; --, therefor.

In Column 2, Line 59, after "operation" delete "a".

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*